US000001229H

United States Statutory Invention Registration [19]

[11] Reg. Number: H1229

McGinley et al.

[43] Published: Sep. 7, 1993

[54] STABILIZING AGENT FOR DRY MIX FOOD PRODUCTS

[75] Inventors: Emanuel J. McGinley, Morrisville; Domingo C. Tuason, Bensalem, both of Pa.; Gregory R. Krawczyk, Princeton Junction, N.J.

[73] Assignee: FMC Corporation, Philadelphia, Pa.

[21] Appl. No.: 555,208

[22] Filed: Jul. 18, 1990

[51] Int. Cl.[5] ..... A23L 1/0534

[52] U.S. Cl. ..... 426/654; 426/453; 426/96; 426/658

[58] Field of Search ..... 426/654, 453, 96

[56] References Cited

U.S. PATENT DOCUMENTS

| | | | |
|---|---|---|---|
| 3,850,838 | 11/1974 | Guckenberger et al. | 426/453 |
| 4,156,020 | 5/1979 | Bohrmann et al. | 426/96 |
| 4,199,608 | 4/1980 | Gilmore et al. | 426/570 |
| 4,208,444 | 6/1980 | Gilmore et al. | 426/570 |
| 4,276,312 | 6/1981 | Merritt | 426/96 |
| 4,311,717 | 1/1982 | McGinley | 426/654 |
| 4,557,938 | 12/1985 | Sander et al. | 426/453 |
| 4,626,287 | 12/1986 | Shah et al. | 426/96 |
| 4,844,921 | 7/1987 | Bakal et al. | 426/98 |
| 4,980,193 | 12/1990 | Tuason, Jr. et al. | 426/654 |

OTHER PUBLICATIONS

Whistler, R. L. and Paschall, E. F., 1967, "Starch: Chemistry and Technology", vol. 2, Academic Press, New York, p. 276.

*Primary Examiner*—Richard D. Lovering
*Assistant Examiner*—Joseph D. Anthony
*Attorney, Agent, or Firm*—Stanford M. Back; Patrick C. Baker; Robert L. Andersen

[57] ABSTRACT

A stabilizing agent for dry mix food products in powder form, the individual particles of which consist essentially of microcrystalline cellulose, sodium carboxymethyl cellulose, and maltodextrin.

8 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

STABILIZING AGENT FOR DRY MIX FOOD PRODUCTS

BACKGROUND OF THE INVENTION

This invention relates to the preparation and composition of a powder capable of functioning as a stabilizing agent for dry mix food products and particularly to a stabilizing agent for so-called instant mixes for foods such as chocolate drinks, ice cream mixes, toppings, sauces, gravies, puddings, and the like.

U.S. Pat. No. 3,539,365 to Durand et al. describes a stabilizing agent consisting primarily of microcrystalline cellulose (MCC) but having intimately associated therewith a relatively small amount, from about 5% to about 15% based upon combined weight, of sodium carboxymethyl cellulose. The product of this Durand et al. patent has been successfully used for a number of years as a stabilizing agent in a variety of food products including a heat sterilized artificial dairy drink as described in U.S. Pat. No. 3,684,523 to McGinley et al. As described in said U.S. Pat. No. 3,539,365 (above), the MCC is in the form of colloidal size microcrystals derived from a suitable cellulose source such as wood pulp by chemical degradation and mechanical disintegration in the presence of water. According to this patent a relatively small amount of water-soluble sodium carboxymethyl cellulose (CMC) is introduced in dry powder form during the mechanical disintegration, and as disintegration proceeds, the dissolved CMC at least partially coats the MCC microcrystals and prevents the microcrystals from rebonding to one another upon subsequent drying. By reason of the coating of CMC, the dried MCC microcrystals are readily redispersed in an aqueous medium with only mild agitation. The product of U.S. Pat. No. 3,539,365 is one component of the powdered form of the stabilizing agent of the present invention, and is thus incorporated herein by reference.

While various functional properties of dispersed colloidal MCC have proven beneficial in a number of wet processed systems for prepared food products, the dried MCC powder has not proven useful in a large food product category known as dry mix preparations, being particularly ineffective in dairy-related dry mix food products such as so-called instant chocolate drinks. It is believed that the protein and calcium salts contained in dry mix food preparations inhibit peptization of the colloidal size MCC microcrystals. In certain instances extreme levels of shear which would be available in a commercial food plant can be utilized to peptize the powder particles of U.S. Pat. No. 3,539,365 in the presence of milk products; however, consumer reconstitution of dry mix food products dictates the activation or peptization of stabilizer components with simple mixing such as spoon stirring.

Commercially made, ready for consumption, chocolate milk drinks employ various stabilizers including the product of U.S. Pat. No. 3,539,365 to hold the cocoa in suspension. There are available for home use dry cocoa, powders and instant mixes which can be added to water or milk to form a chocolate flavored milk or milk-like drink. A major disadvantage of homemade chocolate milk drinks is that the cocoa particles settle very rapidly and if the drink is not consumed very quickly after being prepared or is not stirred continuously the cocoa particles form a heavy sludge in the bottom of the glass.

U.S. Pat. No. 4,311,717 addresses this problem by adding whey or milk solids to the composition of U.S. Pat. No. 3,539,365, i.e. by using a stabilizing agent for various foodstuffs, including chocolate drinks, comprised of MCC, CMC and whey or milk solids. However, this composition must be further treated to partially convert the lactose component of the whey to a nonsticky, free-flowing sugar, preferably by postcrystallization methods, before it can be used, a costly, time-consuming process.

Alternatively, there has been proposed as a stabilizing agent for various foods, particularly frozen dairy type foods, such compositions as MCC and maltodextrin, with or without a hydrocolloid gum; U.S. Pat. No. 4,263,334. See also U.S. Pat. Nos. 4,415,599 and 4,704,294 which disclose compositions comprising starch and maltodextrin as thickening agents for gravies, and U.S. Pat. No. 4,725,441 directed to a pharmaceutical or food tablet coated with a film comprising a combination of maltodextrin and various film-forming plasticizers and the like.

SUMMARY OF THE INVENTION

In accordance with the present invention it has been found that the product of U.S. Pat. No. 3,539,365, namely microcrystalline cellulose having a small amount of sodium carboxymethyl cellulose intimately associated therewith, can be co-processed with maltodextrin as a third component to provide a dry powder stabilizing agent for dairy-related and other dry mix food products which can be effectively dry blended. Food products with which the invention is useful include pie fillings, baked goods, batters, frozen desserts, instant chocolate drink mixes, gravies, and the like.

The resulting composition comprising MCC, CMC, and maltodextrin is characterized in not only having the beneficial stabilizing characteristics of the whey-containing composition of U.S. Pat. No. 4,311,717 or the gum-containing composition of U.S. Pat. No. 4,263,334, but additional and unexpected benefits as well. Thus, for example, there is avoided the post-crystallization steps necessary with the use of whey, as well as the need for pasteurization required by whey because of its protein content (about 12%; the balance—lactose). Furthermore, the use of maltodextrin provides the following additional benefits: (1) color and flavor—the composition avoids the browning of whey when heated, and its cheese-like "dairy" taste; (2) dispersibility and hygroscopicity—maltodextrin is not as hygroscopic as whey, and is more easily dispersible; and (3) dietary tolerance—the problem of lactose intolerance inherent in whey is avoided. Finally, the use of maltodextrin in place of whey, as in U.S. Pat. No. 4,311,717, is also economically desirable because by eliminating the pasteurization and related processing required by whey, food formulations employing the stabilizing agent of this invention can be prepared "in-house", i.e., they do not have to be sent outside to specially-equipped dairies for preparation.

DETAILED DESCRIPTION OF THE INVENTION

In making the stabilizing agent of this invention it is preferred that the sodium carboxymethyl cellulose be properly associated with the MCC before the maltodextrin is introduced. In general, this proper association is obtained by forming an intimate mixture of water, disintegrated MCC (at least 1% by weight having a particle size not exceeding about 1 μm), and sodium carboxymethyl cellulose having a degree of substitution of 0.75±0.15, the amount of sodium carboxymethyl cellulose being from about 5% to about 15% based on the combined weight of MCC and sodium carboxymethyl cellulose, drying the mixture and recovering a powder consisting of water-insoluble, water-dispersible particles capable of forming an aqueous gel wherein at least 1%, by weight, of dispersed particles have a particle size not exceeding about 1 μm. Alternatively, although less desirably, the maltodextrin may first be co-milled with MCC prior to the addition of the CMC provided that this milled mixture, in aqueous slurry form, is thoroughly dispersed prior to the addition of the CMC. For further details as to the method of forming the water-insoluble, water-dispersible MCC/CMC particles reference may be made to the aforementioned U.S. Pat. No. 3,539,365.

Maltodextrin is defined as a non-sweet, nutritive mixture of saccharide polymers that consist of D-glucose units linked primarily by alpha 1–4 bonds having a Dextrose Equivalent (DE) of less than 20. (For purposes of this invention DE's of up to about 25 are intended to be included, i.e. DE's technically falling within the lower range of corn syrup solids). It is prepared as a white powder or concentrated solution by the partial hydrolysis of corn starch with safe and suitable acids and/or enzymes. Typically, over 80% of maltodextrin consists of pentasaccharides and above. A suitable maltodextrin for use in the present invention includes Maltrin® maltodextrins from Grain Processing Corporation, and Amaizo Fro-Dex® maltodextrin from American Maize-Products Company.

Because of taste and flavor considerations, it is preferred to use a maltodextrin having a DE of about 15–18. While maltodextrins having a lower DE of about 5, or a higher DE of about 25 are effective in preventing the formation of lumps, the taste, flavor, and aroma of the foodstuff is less desirable than that obtained through the use of maltodextrin having the preferred DE of about 15–18. (At DE's above 20 the maltodextrin becomes increasingly hygroscopic and is also more subject to browning.)

The maltodextrin can be added to an aqueous dispersion of the product of the U.S. Pat. No. 3,539,365, namely the intimately associated MCC and sodium carboxymethyl cellulose, prior to the drying and recovery steps, or the dried MCC/CMC powder form or as reconstituted in water. After the addition of the maltodextrin the entire dispersion is thoroughly mixed until a homogeneous slurry of the three components is obtained. The maltodextrin is added in an amount such that the solids content of the slurry has a ratio of maltodextrin to the MCC/CMC powder of between 1:1 and 9:1, preferably about 3:1. A ratio of 1:1 is the minimum level of maltodextrin necessary to obtain the functionality of the MCC/CMC powder. A ratio of more than 9:1 produces a product wherein the particles are so predominantly maltodextrin that the dispersion of MCC/CMC particles is inhibited until the maltodextrin dissolves, thus prohibiting the desired instant dispersion of the microcrystalline cellulose. After obtaining homogeneity, the slurry is mechanically milled. In carrying out the milling the MCC-CMC mixture must be thoroughly dispersed and hydrated, preferably by homogenization in water, prior to addition to the maltodextrin in order to obtain a uniform product. In most cases milling alone provides sufficient mixing; however, an improved product can sometimes be obtained by the further use of a homogenizer and/or colloid mill.

The three intimately associated components, i.e., the MCC, the CMC, and the maltodextrin, are dried and recovered as a powder having a moisture content of approximately 6% or less, typically about 0.5–4%. Various methods of drying and recovering the powder may be employed. The drying, preferably spray drying, is desirably carried out wherein the solids dispersed in the aqueous slurry are from about 10 to 25%, preferably about 10–20% solids. An aggregated, free flowing material of larger particle size may be obtained by recirculating the finest fraction of the dried product through the spray dryer.

The stabilizer powder particles prepared as above described when blended into dry food mixes, generally in amounts of 2 to 10% based on the weight of the finished foodstuff, and preferably about 3 to 5%, and then reconstituted in water, instantly hydrate and disintegrate into individual microcrystals with simple mild agitation. In addition, when utilized at proper concentrations, dispersed microcrystals quickly link into a weak gel network and provide immediate functionality in the form of emulsion stability and foam stability. The microcrystals also serve as a suspending agent and an aqueous thickener.

Following are some examples of the manufacture and use of the powdered stabilizing agent of the invention.

EXAMPLE 1

The following example illustrates the preparation of the powdered stabilizing agent of this invention in which four runs demonstrate different conditions and equipment used to make the dry, three-component powder. In these runs all ingredients were spray dried on a 8' diameter Stork-Bowen dryer using a 7" inverted disc. The MCC/CMC component (AVICEL RC 591F; FMC Corporation, Philadelphia, PA) comprised 88% by weight (88 lbs.) of MCC and 12% by weight (12 lbs.) of CMC. This component mixture, prior to addition of the maltodextrin (DE 15) was thoroughly hydrated and dispersed in the aqueous slurry by a Lightning mixer for 30 minutes. Sufficient maltodextrin was added to make up a 75 wt. % maltodextrin/25 wt % MCC-CMC mixture, and the volume of water in the slurry adjusted to provide 10–15% solids dispersion.

A first run was made at 10% solids. A second run was successfully spray dried at 15% solids. Both products were processed the same way prior to drying: dispersing the MCC-CMC using two Lightning mixers, in deionized water for one-half hour; pumping via a Moyno pump through a Tekmar Dispax mill to a second tank; and dispersing and blending with a 2-stage homogenizer in pumping to the spray dryer. The slurry was pumped through the homogenizer at pressures totalling 3000 psi for the two stages. During the first run the product was dried at an outlet temperature of about 200° F. and an inlet temperature of 400° F.; the wheel speed of the centrifugal spray drying system was 15,700 rpm. These conditions were also used in Run 2.

In the third run the homogenizer was not used. This run was split three ways: one-third through the Tekmar Dispax to the dryer; one third direct to the dryer without the Dispax; and one-third direct, no Dispax, and at the highest wheel speed (20,800 rpm).

The fourth run was processed the same as number three except that an 18 DE maltodextrin was used in the ingredient composition.

In Examples 4 to 9 the composition of Run 2 of Example 1 was used in a series of food formulations in which the weight percent ratio of MCC-CMC:maltodextrin (DE-15) was 25:75.

EXAMPLE 2

The following examples illustrate the alternate methods of either pre-mixing the MCC and CMC, followed by addition of the maltodextrin, or the mixing of the MCC with maltodextrin prior to addition of the CMC. Of these, the former method is preferred.

Attrited MCC wet cake, as described in U.S. Pat. No. 3,539,365, (230.23 g) was dispersed at a 22% level (on a dry weight basis of the finished ingredient product) in deionized water (3,901.07 g) at a 2.5% solids level using a colloid mill, and processed for 30 minutes. Thereafter, 7.09 g of CMC (7LF-FMC Corp.) and 7.09 g CMC (7MF-FMC Corp.) were added at a 3% dry weight basis and the MCC-CMC milled for 30 minutes. Maltodextrin (DE 15) was then added at a 75% level (on a dry weight basis of the finished product) to make a slurry, and milled for another 15 minutes. The slurry was homogenized at 3000 psi (2500 psi—1st stage; 500 psi—2nd stage), and then spray dried on a 3' Bowen spray dryer at 210° C. (410° F.) outlet temperature using a 0.1 inch nozzle opening and atomizing air pressure of 90 psi to provide a dry powdered MCC-CMC/maltodextrin stabilizing agent.

In accordance with the foregoing procedure, but first adding the maltodextrin to the attrited MCC wet cake, and milling the slurry for 30 minutes until the mixture is thoroughly hydrated, followed by addition of the CMC, and milling or another 15 minutes, there is obtained a satisfactory MCC-CMC/maltodextrin composition of this invention.

EXAMPLE 3

The following comparative example illustrates a MCC-maltodextrin composition in which the CMC component is omitted. As will be seen, this composition, when used to stabilize a dry powdered chocolate drink mix (like that used in Example 4), resulted in an unsatisfactory separation, i.e. settling out of suspension, of the cocoa.

In accordance with the general procedures of Example 2, attrited MCC wet cake (274.39 g) was dispersed at a 25% level (on a dry weight basis) in deionized water (3,871.11 g) and processed for 30 minutes in a colloid mill. Maltodextrin (354.5 g) was added at a 75% level (dry weight) to make a slurry and milled for 15 minutes. The slurry was homogenized at 3000 psi, and spray dried in accordance with the preceding example.

This dried MCC-maltodextrin material, when tested as a stabilizing, i.e. suspension, agent in a chocolate drink mix did not suspend the cocoa solid effectively: there was a phase separation of the solids and water.

EXAMPLE 4

Chocolate Drink

A chocolate drink from a powdered mix was prepared as follows:

| Ingredients | % | g |
|---|---|---|
| Sugar | 7.5 | 37.5 |
| Non fat dry milk | 5.8 | 29.0 |
| Cocoa* | 0.5 | 2.5 |
| MCC/CMC/maltodextrin | 4.0 | 20.0 |
| | 17.8 | 89.0 |
| Water | 82.2 | 411.0 |
| | 100.0 % | 500.0 g |

*Powdered cocoa, Nestle Foods Corp.

The foregoing ingredients were dry-blended and the mixture slowly added to water while mixing with a Lightning mixer at 1000 rpm. The mixing was continued for 15 minutes until all the material was fully dispersed, and the mixture stored in the refrigerator overnight. On examination after 24 hours there was no visible evidence of cocoa particles settling.

EXAMPLE 5

Cheese Sauce

A cheese sauce was prepared from the following dry mix:

| Ingredients | % | g |
|---|---|---|
| Cheese powder* | 52.08 | 20.00 |
| MCC/CMC/maltodextrin | 26.04 | 10.00 |
| Starch** | 13.02 | 5.00 |
| Salt | 7.89 | 3.00 |
| Onion powder | 0.66 | 0.25 |
| White pepper | 0.26 | 0.10 |
| Paprika | 0.13 | 0.05 |
| | 100.00 % | 38.40 g |

*Beatrice Foods Inc.
**Purity 420, National Starch Co.

The above dry mix of ingredients was blended together and added to one cup (241 ml) of cold milk and stirred constantly in a double boiler on medium to high heat until the sauce reached a temperature of 170° F. Thereafter the sauce was heated at 185° F. for two minutes while stirring constantly. After cooling to room temperature and refrigerating overnight, the mixture was set as a smooth, viscous cheese sauce.

EXAMPLE 6

Hollandaise Sauce

A hollandaise sauce was prepared according to the following:

| Ingredients | % | g |
|---|---|---|
| MCC/CMC/maltodextrin | 38.30 | 10.00 |
| Vegetable oil powder* | 21.22 | 5.54 |
| Starch** | 19.15 | 5.00 |
| Egg yolk solids | 15.32 | 4.00 |
| Salt | 3.06 | 0.80 |
| Citric acid | 2.68 | 0.70 |
| Lemon/herb flavor | 0.27 | 0.07 |
| | 100.00 % | 26.11 g |

*Vee-Kreme, Type CWS, Code 7906, FIDCO
**Purity 420, National Starch Co.

The above dry mix of ingredients was blended together and added to ⅔ cup (170 ml) of cold water and stirred constantly while heating in a double boiler on medium to high heat until a temperature of 170° F. was reached. Thereafter the sauce was heated at 185° F. for two minutes while stirring constantly. After cooling to room temperature the mixture was refrigerated overnight. The mixture was found to set as a smooth, viscous hollandaise sauce.

EXAMPLE 7

Salad Dressing

A salad dressing was prepared as follows:

| Ingredients | % | g |
|---|---|---|
| MCC/CMC/maltodextrin | 27.58 | 8.00 |
| Kolloid Cr* | 26.58 | 8.00 |
| Sugar | 17.24 | 5.00 |
| Parmesan cheese | 13.80 | 4.00 |
| Romano cheese | 6.90 | 2.00 |
| Spice blend** | 6.90 | 2.00 |
| | 100.00 % | 29.00 g |
| Additional Ingredients | | |
| Vinegar (50 grain) | | 56.00 |
| Water | | 94.00 |
| Oil | | 66.00 |
| | | 245.00 g |

*Blend of vegetable gums, functional proteins, stabilizing salts; Colony Import & Export Corp.
**Italian Dressing seasoning, McCormick Co.

The MCC-CMC/maltodextrin stabilizing agent was dispersed in water for 5 minutes using a Lightning mixer at 1000 rpm, after which the Kolloid Cr blend of vegetable gums was added and mixed in for 5 minutes. The remaining ingredients were added at 1 minute intervals with mixing to provide a stable Cheese/Italian type salad dressing. (In this example both the percent and gram weight total 100.)

EXAMPLE 8

Microwave Pancakes

A batter for microwave pancakes was made from the following dry mix:

| Ingredients | %; g (wt) |
|---|---|
| Cake flour[1] | 48.93 |
| Corn flour[2] | 18.91 |
| Non fat dry milk | 6.00 |
| Sugar | 5.36 |
| Rice flour[3] | 4.85 |
| MCC/CMC/maltodextrin | 4.85 |
| Whole dried egg | 3.70 |
| Salt | 2.08 |
| Dextrose | 1.90 |
| Baking soda | 1.72 |
| Sodium aluminum phosphate | 1.25 |
| Monocalcium phosphate, monohydrate | 0.45 |
| | 100.00 |

[1]Softasilk, enriched, bleached, Betty Crocker, General Mills, Inc.
[2]Yellow corn flour #3, Quaker Oats Co.
[3]Long grain rice flour, Archer, Daniels, Midland.

The above ingredients were dry-blended and added to 140 g of water, and mixed with a wire whip. The mixture was cooked on a griddle at 380° F. for 3 minutes per side, then cooled on a cooling rack. The separated pancakes were wrapped and frozen for 24 hours. When reheated in a microwave oven for 30 seconds at full power, the pancakes were found to be lighter, with more stack height and uniformity in shape than comparable non-stabilized commercial pancakes. Moreover, the batter was found to retain its shape more and not spread on the griddle when first cooked.

EXAMPLE 9

Whipped Topping

A whipped topping was made according to the following procedure:

| Ingredient | % | g |
|---|---|---|
| Whipped topping base* | 48.46 | 20.72 |
| Sugar | 43.66 | 18.67 |
| MCC/CMC/maltodextrin | 7.67 | 3.28 |
| Vanilla Flavor | 0.21 | 0.09 |
| | 100.00 | 42.76 g |

*Wip Treme, 3554, Beatrice Foods Inc.

To a dry blend of all the ingredients was added 120.5 g (½ cup) of cold milk. The mixture was blended at low speed in a 5 qt. Hobart mixer equipped with a wire whip for 1 minute, followed by high speed mixing for 6 minutes. The resulting whipped topping with the MCC/CMC/maltodextrin showed better stand-up (peaks) and less syneresis than a control without any stabilizing agent.

We claim:

1. A powdered stabilizing agent for dry mix food products, the individual particles of said powder consisting essentially of an intimate, coprocessed admixture of microcrystalline cellulose, sodium carboxymethyl cellulose and maltodextrin, the ratio by weight of the maltodextrin to the combination of microcrystalline cellulose and sodium carboxymethyl cellulose being between 1:1 and 9:1.

2. The powder of claim 1 wherein said ratio is about 3:1.

3. The powder of claim 1 wherein the maltodextrin has a dextrose equivalent of from about 5 to 25.

4. The powder of claim 1 wherein the maltodextrin has a dextrose equivalent of from about 15 to 18.

5. A food composition comprising a foodstuff having incorporated therein the powder of of claim 1 in an amount sufficient to stabilize the foodstuff when reconstituted in water.

6. A food composition comprising a foodstuff having incorporated therein the powder of of claim 2 in an amount sufficient to stabilize the foodstuff when reconstituted in water.

7. A food composition comprising a foodstuff having incorporated therein the powder of claim 3 in an amount sufficient to stabilize the foodstuff when reconstituted in water.

8. A food composition comprising a foodstuff having incorporated therein the powder of of claim 4 in an amount sufficient to stabilize the foodstuff when reconstituted in water.

* * * * *